United States Patent [19]
Friend et al.

[11] Patent Number: 6,055,517
[45] Date of Patent: Apr. 25, 2000

[54] METHOD OF DETERMINING OPTIMAL ASSET ALLOCATION UTILIZING ASSET CASH FLOW SIMULATION

[75] Inventors: Edward H. Friend, Washington, D.C.; Robert T. McCrory, Seattle, Wash.

[73] Assignee: EFI Actuaries, Washington, D.C.

[21] Appl. No.: 09/016,632

[22] Filed: Jan. 30, 1998

Related U.S. Application Data

[63] Continuation-in-part of application No. 08/550,503, Oct. 30, 1995, Pat. No. 5,774,881
[60] Provisional application No. 60/037,109, Jan. 31, 1997.

[51] Int. Cl.[7] .................................................. G06F 17/60
[52] U.S. Cl. .................................................................. 705/36
[58] Field of Search ..................................... 705/36, 1, 35

[56] References Cited

U.S. PATENT DOCUMENTS 5,812,988   9/1998   Sandretto .................................. 705/36

OTHER PUBLICATIONS

IBM (Dick Shareshian), Funds Allocation System, The Funds Management Group, Inc., 1985.

Ranftle et al., Helping Employees Invest Wisely, HRMagazine, Nov. 1993.

*Primary Examiner*—Allen R. MacDonald
*Assistant Examiner*—Susanna Meinecke-Diaz
*Attorney, Agent, or Firm*—Irah H. Donner; Suresh Koshy; Pepper Hamilton LLP

[57] ABSTRACT

A method of simulating future cash flow for a given asset allocation under a variety of economic conditions, measuring the frequency of failure of the cash flow to avoid one or more predefined risks. Assigning user-selected weights to avoidance of specified risks and alternative user-selected weights to maximization of rate of return, the invention utilizes the cash flow simulation to produce a performance index. By methodological testing through asset allocation adjustments, the optimum performance index is determined, thereby identifying the optimum asset allocation.

17 Claims, 10 Drawing Sheets

METHOD OF DETERMINING OPTIMAL ASSET ALLOCATION UTILIZING ASSET CASH FLOW SIMULATION

RELATED APPLICATIONS

This application is a continuation-in-part application of U.S. patent application Ser. No. 08/550,503, filed on Oct. 30, 1995 now U.S. Pat. No. 5,774,881, incorporated herein by reference. This application claims priority to U.S. provisional patent application Ser. No. 60/037,109, filed Jan. 31, 1997, incorporated herein by reference.

BACKGROUND OF THE INVENTION

1. Field of the Invention

In consideration of an investment portfolio, such as a pension fund, with oversight by law board members, the invention concerns non-sophisticated methods of determining an optimum allocation of assets to generate a maximum rate of return consonant with recognition of specified risk avoidance criteria. More specifically, the invention provides a method of simulating future trust fund cash flow for a given asset allocation and measuring the frequency of failure of the cash flow to avoid one or more predefined risks. Applying user-selected weights to frequencies of failure to avoid specified risks supplemented by the application of user-selected weight to rate of return, the invention produces a performance index. Through methodical asset allocation adjustments, the optimum performance index is determined, thereby identifying the optimum asset allocation for the given criteria.

2. Background of the Related Art

Trustees of pension funds seek the highest possible investment return within acceptable risk parameters. Heavy investments in common stock produce high returns, for example, but these returns are volatile, and this volatility may lead to an unacceptable frequency of failure to avoid certain kinds of risk. Investments in cash equivalents are far less volatile, but yields are unacceptably low and, accordingly, plans with such assets may experience unacceptable frequency of failure to avoid other kinds of risk. An optimum asset allocation made up of stocks, bonds, cash equivalents and other asset classes is therefore desirable to minimize frequency of failure to avoid predefined risks while maintaining acceptable returns. It is difficult, however, to determine what mix of asset classes and in what proportion the best performance likelihood is produced, taking into consideration user-identified risk avoidance criteria.

Various methods are currently used by pension fund managers in an attempt to maximize return while minimizing risk. For example, one such method of solving the problem of maximizing return while minimizing risk involves developing the asset allocation likely to produce the highest return at a given level of portfolio volatility. This method, however, is not a plan-specific solution and therefore may not produce the best results for a given plan. Another approach is to develop the asset allocation which, within a stipulated time horizon at the calculated plan contribution level, will lead to an acceptable probability of achieving a selected funded ratio of assets to liabilities. While this approach is plan-specific, as different solutions apply to different plans with different levels of assets, such an approach involves consideration of probability of meeting one goal at a fixed point in time, rather than frequency of failure to avoid multiple risks at multiple time frames. Moreover, such an approach requires a sophisticated understanding of the manner in which liabilities are developed. For example, funding ratios can change with changes in actuarial assumptions, creating a degree of artificiality in the measurement. Finally, a focus on a stipulated time horizon involves a restricted view which can be modified only upon considerable revision.

In view of the above, it is an object of the invention to provide a method of determining an optimum allocation of assets to generate a maximum rate of return for an investment portfolio within acceptable risk level (s), overcoming the deficiencies of the conventional methods discussed above.

SUMMARY OF THE INVENTION

The invention provides a non-sophisticated method of simulating future cash flow for a given asset allocation under a variety of economic conditions, measuring the frequency of failure of the cash flow to avoid one or more predefined risks. Assigning user-selected weights to avoidance of specified risks and alternative user-selected weights to maximization of rate of return, the invention utilizes the cash flow simulation to produce a performance index. By methodological testing through asset allocation adjustments, the optimum performance index is determined, thereby identifying the optimum asset allocation.

The simulation of cash flow generates a plurality of asset cash flow projections for a given asset allocation that are evaluated by (i) counting plan-specific failures to avoid predefined risks and (ii) determining average investment return, and applying user-selected weightings to the predefined risk failure rates and average return for each asset allocation. The predefined risks are generally established at a threshold multiple of a risk factor as of a given time or within a given time frame, such as no less than a specific percentage of payroll costs at, for example, five years from the commencement of the instant analysis or assets less than a multiple of benefits outflow at any time prior to for example, ten years from the commencement date of the instant analysis.

The occurrence of an asset cash flow projection falling below the risk tolerance baseline at a point in time or within a baseline time period defines a risk tolerance failure event. For the asset cash flow projections associated with a given asset allocation, the number of risk tolerance failure events is multiplied by the associated weight for each predefined risk. A weighted average return (or weighted average gain cost) is introduced. The asset allocation is then adjusted within allowable asset class limits and the process is repeated until the highest-weighted result, identified as the highest performance index, is achieved. This then is the optimum asset allocation.

This invention determines a plan specific optimal asset allocation, where plan specific means the computer process produces a result for any particular plan described by its projected benefit cashflow and projected covered payroll or alternatively by its specific characteristics such as one or more:

- its particular plan membership (each active member having an identifying salary history, date of birth, sex and date of hire or other date of plan participation commencement . . . and each pensioner and designated survivor having identifying date of birth, sex and formulated current or deferred annual benefit stream).
- its particular plan design representing the rules for benefit eligibility and how a benefit is calculated.
- its particular funding status (plan assets on hand) and its particular sources of future new funds determined by its specific financing formula.

and/or any other feature of the particular plan.

Optimal asset allocation means dividing or distributing the current and/or future plan assets among one or more available asset classes (e.g., domestic common stock, foreign bonds, real estate, cash equivalents, etc.) in that particular tolerable arrangement, demonstrated by a simulation of, for example, future financial projections of user-selected risk tolerance factors in association with user-selected risk tolerance baselines, likely to produce the best or preferred risk tolerance failure performance as measured by a performance index.

Tolerable asset allocation is one whose proportionate arrangement falls within, for example, the user's predetermined range of acceptable asset allocation assignments to the one or more available asset classes (e.g., no less than 40 percent nor more than 75 percent of the portfolio shall consist of domestic equities, no less than 10 percent nor more than 50 percent of the portfolio shall consist of domestic bonds, etc.).

Simulation of a future financial projection shall be, for example, a large or substantial number of such financial projections each generated by (or as the result of) a series of, for example, Monte Carlo controlled random inflation and "real" return (return net of inflation) selections from the past, user modified past, or parametrically anticipated future behavior of plan assets invested in accordance with the selected asset allocation (e.g., a large number of cash flow projections of future plan asset levels or a large number of future fundable plan cost projections determined as the result of controlled random selections of inflation and real investment return from a past defined period).

Risk tolerance factor is a characteristic of the plan's future financial behavior, for example, as of a given point in time, as of a series of points in time, or as an average within a specified period, including but not limited to, for example, one or more of:

its asset level its fundable cost level

Risk tolerance baseline is a second or another characteristic of the plan's future financial behavior against which the risk tolerance factor is compared as of a given point in time, as of a series of points or interval in time or as an average within a specified period, including, for example, but not limited to:

its annual benefit outflow level its asset level its fundable cost level the payroll of participating active plan members either in the current year or in a prior or future year.

Risk tolerance failure is the relative frequency of adverse comparisons. A comparison is a feature of the relationship of the risk tolerance factor to the risk tolerance baseline (e.g., one becomes larger than the other).

As an example, identification of that particular asset allocation predicted by simulation likely to cause the lowest frequency of assets falling below 10 times annual benefits over the next 10 years or lowest frequency of assets falling by 20% (or more) or any other selected percentage in one year.

A performance index is the user-selected weighted average of or user defined risk tolerance failures among user-selected risk tolerance factors compared to the one or more risk tolerance baselines (e.g., 30% weight on risk tolerance failure rate measured by frequency of assets falling below 10 times annual benefits at a point 5 years hence and 70% weight on risk tolerance failure rate measured by frequency of cost rising by 15 percent or more as a percentage of payroll at any time over the next 10 years).

Graphs A, B, and C reflect 100-trial simulations of the cash flow of a particular pension trust fund over the 20-year period 1994 through 2014 under each of three different asset allocation selections.

Graph B reflects cash flows if the assets of the trust fund are invested 100% in stock. Graph C reflects cash flows if the assets are invested 100% in cash equivalent securities. Graph A, on the other hand, reflects cash flow if the assets are involved in stocks (63%), and cash (9%).

In 1994 the trust fund has assets of 350% of the active member payroll. Over the years, these assets are increased by investment return, employer and employee contributions and reduced by pensioner benefit disbursements and expenses.

The trustees want to maximize return in the asset allocation selection but also want to protect benefit security. If converted into the purchase of annuities, a lump sum of somewhat less than, but in the neighborhood of, 10 times benefits would be required to protect the security of all pensioners of record at any point in time. Trustees regard this as a floor of protection. The risk of failure to provide this protection throughout the next 20 years is of concern.

A line at the bottom of each graph reflects 10 times evolving benefit disbursements. Benefit disbursements increase more rapidly than payroll, starting at 19.5% of payroll in 1994 and reaching 36.5% of payroll in the year 2014. The 10 times numbers are 105% in 1994 and reach 365% in the year 2014.

Note the cross-overs in Graph A. In 1999, two of the simulations violate the ten times line. In 2004, five simulations violate the line at that time and so on. Also note that the all-cash program has only one failure before the twentieth year but then, in the twentieth year, there are 82 failures because the investment return is insufficient to protect the program and the assets begin to fall relative to payroll.

If the trustees place 60% weight on optimum return and 10% negative weight on failures at the intervals five years, ten years, fifteen years, and twenty years out, we have the following determinations.

TABLE 1

| Asset Allocations | Expected Investment Return | Funding Percentage | | | | Performance Index[1] |
|---|---|---|---|---|---|---|
| | | 5 Years Out | 10 Years Out | 15 Years Out | 20 Years Out | |
| A | 8.5% | 2 | 5 | 6 | 13 | 2.5[2] |
| B | 10 | 4 | 9 | 13 | 19 | 1.5[3] |
| C | 5 | 0 | 0 | 1 | 82 | −5.3[4] |

[1]60% Expected Investment Return − 10% of each Failure Percentage.
[2].6 × 8.5 − .1(2 + 5 + 6 + 13).
[3].6 × 10 − .1(4 + 9 + 13 + 19).
[4].6 × 5 − .1(0 + 0 + 1 + 82).

The trustees, if given asset allocations A, B, and C would, based on the above criteria, select asset allocation A because of the superior performance index.

Clearly, Table 1 above is illustrative only. There are many performance indices that could be constructed involving many more than one failure criterion. Nevertheless, the above is illustrative of how the process works.

Figure 9A:
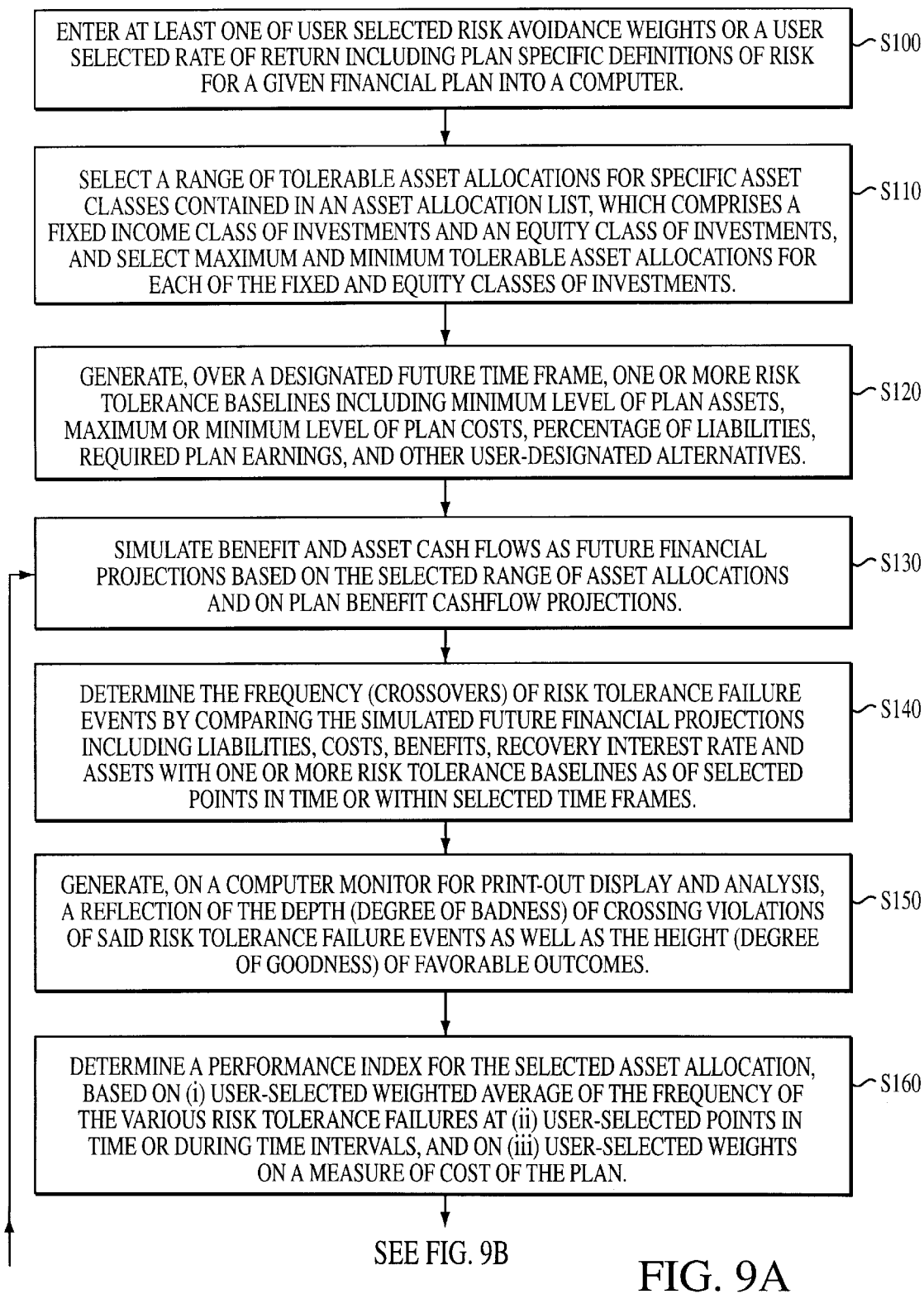
FIGS. 9A and 9B is a flow chart of an embodiment of the instant invention.
Figure 9B:
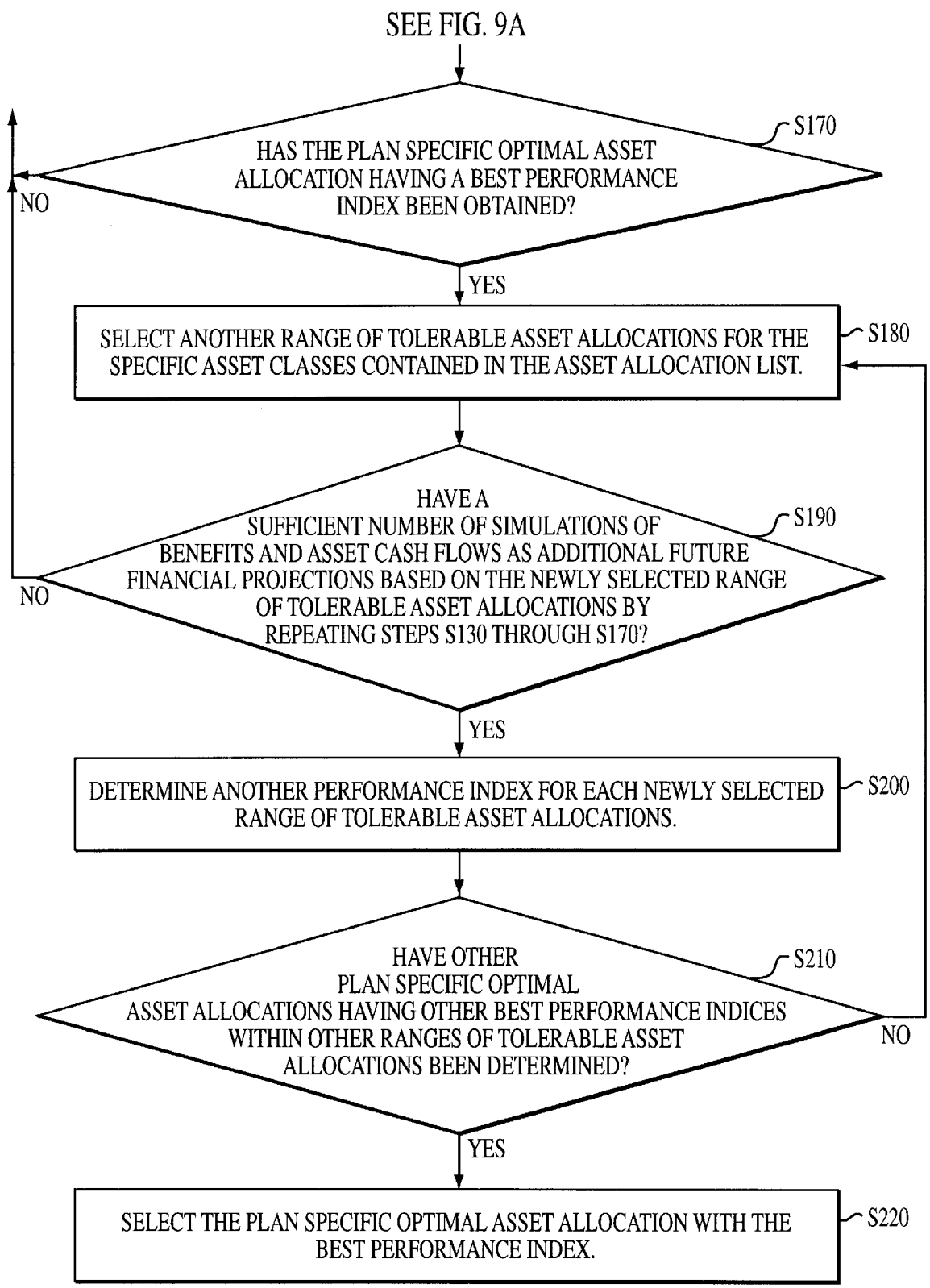

By way of illustration, FIG. 9 shows an embodiment of the instant invention

In Step S100, the user enters user selected risk avoidance weights and/or a rate of return including plan specific definitions of risk for a given financial plan into a computer. In Step S110, the computer and/or the user selects a range of tolerable asset allocations for specific asset classes contained in an asset allocation list, which comprises a fixed income class of investments and an equity class of investments, and select maximum and minimum tolerable asset allocations for each of the fixed and equity classes of investments.

In Step S120, the computer according to the instant invention generates, over a designated future time frame, one or more risk tolerance baselines including minimum level of plan assets, maximum or minimum level of plan costs, percentage of liabilities, required plan earnings, and other user-designated alternatives. In Step S130, the computer in accordance with the instant invention simulates benefit and asset cash flows as future financial projections based on the selected range of asset allocations and on plan benefit cashflow projections. In Step S140, the computer determines the frequency (crossovers) of risk tolerance failure events by comparing the simulated future financial projections including liabilities, costs, benefits, recovery interest rate and assets with one more risk tolerance baseline as of selected points in time or within selected time frames.

In Step S150, the computer according to the instant invention generates, on a computer monitor for print-out display and analysis, a reflection of the depth (degree of badness) of crossing violations of said risk tolerance failure events as well as the hright (degree of goodness) of favorable incomes. In Step S160, the computer determines a performance index for the selected asset allocations, based on (i) user-selected weighted average of the frequency of the various risk tolerance failure at (ii) user-selected points in time or during time intervals, and on (iii) user-selected weights on a measure of cost of the plan.

In Step S170, the computer inaccordance with the instant invention determines whether the plan specific optimal asset allocation having a best performance index has been obtained. If not, Step 130 through S170 are repeated.

In Step S180, the computer and/or the user selects another range of tolerable asset allocations for the specific asset classes contained in the asset allocation list. In Step S190, the computer determines whether a sufficient number of simulations benefits and asset cash flows as additional future projections based on the newly selected range of tolerance asset allocations by repeating steps S130 through S170.

In Step 200, the computer determines another performance index for each newly selected range of tolerance asset allocations. In Step S210, the computer determines whether other plan specific optimal asset allocations having other best performance indices within other ranges of tolerance asset allocation have been determined. In Step S220, the computer according to the instant invention selects the paln specific optimal asset allocation with the best performance index.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

SECTION 1

PLAN-SPECIFIC

ASSET ALLOCATION (PSAA)

What is it?

Why use it?

How does it work?

BACKGROUND Q AND A

Q Why not allocate 100% to stock so long as new contributions take care of benefits?

A Political risk. Despite prior good performance, heavy criticism from members and press if markets fall. Out of step. "You would have been better off with a passbook account at the local bank."

Q Shouldn't trustees adopt a 20-year (or longer) horizon in development of an asset allocation? This would justify 100% stock?

A Perhaps, but this perspective is rare. Most Board members have a five year or shorter horizon. "If avoidable, don't let it happen on my watch."

Inflation-adjusted returns of large cap stocks have been:

For the ten 20-year periods, a 6.1% spread,

Highest: 8.9%,

Lowest: 2.8%,

Average: 5.35%

For the 25 five-year periods, a 24.5% spread!

| Top nine (36%): | 9.4% to 16.1%; | average: | 12.33% |
| Middle nine (36%): | 2.8% to 8.6%; | average: | 5.63% |
| Lower seven (28%): | −8.4% to −1.8%; | average: | −4.26% |

Note: Inflation is to be added to the above percentages to get actual (nominal) returns.

Q As respects stocks, what is the difference between the long view and the short view?

A Pronounced difference in volatility. Over the last 30 years there have been ten 20-year periods and 25 five-year periods. Look at what has happened in the past:

Q How is this information to be interpreted?

A Given a five-year horizon, trustees need to be aware of the risks and include stock in their portfolio in recognition of these risks.

Q Anything else?

A Yes! If we are going to price our programs using nominal annual investment return assumptions in the neighborhood of 8% per annum, we can't avoid the risks and invest in cash equivalent securities. We must face up to the need to take risks but we need to understand and control these risks.

DEVELOPING A DESIRABLE ASSET ALLOCATION is the process of developing a desirable distribution of fund assets among available asset classes, like:

stocks, bonds, cash . . .

for purposes of investment.

DEVELOPING A DESIRABLE ASSET ALLOCATION is also called

ASSET ALLOCATION OPTIMIZATION

CONVENTIONAL ASSET ALLOCATION (CAA) OPTIMIZATION

The CAA optimization process simulates investment return behavior and develops the optimum asset allocation for a selected investment return . . . the one which anticipates the least asset fluctuation. However, it:

(i) takes into consideration only the relative risk of asset volatility for a selected return expectation, (ii) does not provide a ready measure of superiority of one asset allocation over another, (iii) produces same results, regardless of plan cash flow and regardless of plan funded condition; i.e., it is not plan-specific.

PLAN-SPECIFIC ASSET ALLOCATION (PSAA) OPTIMIZATION

The PSAA optimization process simulates future behavior of your plan and:

involves developing an asset allocation which will satisfy your plan-specific risk avoidance criteria based on your assets and your cash flow . . . and tell you how good it is relative to alternative asset allocation configurations by identifying its relative failure rate.

Illustrations of weightable risk avoidance criteria are:

Avoid an employer/sponsor percentage of payroll increase from a current 10% of payroll to 15% of payroll after 10 years, Avoid having the market value of assets fall below ten times benefit payout at any time during the next 5 years, Avoid a drop in market value of assets over the next four years of such a magnitude that it will take an annual rate of return averaging more than 13% over the following ten years to recover to where the assets would have been by earning the actuarial rate of 8½%.

As a supplemental feature, PSAA permits combining the weighted risk avoidance failure rate associated with any asset allocation with either or both:

(i) investment return (as anticipated under the specified asset allocation) which is given a weight and (ii) your plan cost (as anticipated under the specified asset allocation using the investment return, your assets, and your cash flow), which is a weight to create a performance index for the asset allocation. Weights add p to 100%

PSAA can also identify the asset allocation with the best performance index . . . also called the optimum performance index.

Note that under PSAA, performance is considered . . . not in abstract terms relative to failure to meet certain investment return criteria . . . but in terms of how the fund serves the plan in avoiding risks.

Moreover, the liabilities of the plan (its negative cash flow) and both the contribution income and investment return of the underlying fund (its positive cash flow), as well as the relative size of the find, are all considered.

WHAT, THEN, IS PSAA?

It is asset allocation which is governed by the favorable interweave of anticipated asset class behavior and the economic/demographic profile of a particular defined benefit pension system

A CONCEPTUAL ILLUSTRATION OF PSAA

Consider two plans, the first not well funded at all and the second with heavy well funded portfolio of assets.

Both plans have the same benefit cash flow requirements with current benefits approaching current contribution levels. In the past, based on overriding Trustee philosophy, each would have commanded the same asset allocation.

Under PSAA, the first plan would likely get a heavier common stock allocation because severe asset volatility of a lightly funded plan is not likely to be responsible for much increase in failure rates.

However, when assets are substantial, failure rates are more likely to be affected. If the second plan adopted an aggressive investment allocation, there would be a danger of heavy losses and significant contribution increase requirements.

ANOTHER CONCEPTUAL ILLUSTRATION OF PSAA

Consider two plans. The first plan has substantial assets. However, some of the investment return helps finance the current benefit flow, which exceeds current contributions. The second plan also has substantial assets. Current contributions are more than enough, however, to pay current benefits with the remainder helping to build the assets further.

Both have the same market value of assets and, based on overriding Trustee philosophy would in the past have commanded the same asset allocation.

The second plan would likely generate low failure rates under both conservative and aggressive portfolios. Accordingly, with failure rates neutralized, the opportunity for higher investment return and/or lower cost of plan would likely tilt the second plan's performance index in favor of the more aggressive approach.

If the first plan invested heavily in stock, there is a danger its trustees will not avoid the risks which concern them.

A SIMPLE ILLUSTRATION OF PSAA

The fund stands slightly above a failure criterion of ten times benefits.

The investment managers are loathe to take risk and promise to invest the assets in cash equivalents.

But benefits may be expected to rise from the addition of new pensioners.

At this rising, multiplying the benefit payment times ten will likely exceed the fund balance.

The failure rate 5 years from now attributable to an allocation of 100% of the assets to cash is 66.4%.

Other failure rates for alternative asset allocations for:

| Asset Allocations | | | Failure |
|---|---|---|---|
| Stocks | Bonds | Cash | Rate |
| 100% | | | 29.6% |
| | 100% | | 34.0% |
| 60% | 30% | 10% | 27.2% |

The optimum asset allocation is:

| Asset Allocations | | | Failure |
|---|---|---|---|
| Stocks | Bonds | Cash | Rate |
| 55% | 31% | 14% | 26.6% |

A REALISTIC ILLUSTRATION OF PSAA

Part 1

Consider the following:

The Board expresses aversion to the risk of an asset configuration which would permit the underlying assets of the fund to tall to less than ten times benefit payout over the next four years.

[Ten times is used here as the cost of an annuity to fund the pensioner's lifetime annual benefit.]

Note: If assets are currently 20 times benefit payout, even a one-third drop in asset value would not bring on a failure. Accordingly, the opportunity to invest heavily in stock is justified because the fund stands well above its failure line.

A REALISTIC ILLUSTRATION OF PSAA

Part 2

The Board also expresses aversion to the risk of an asset fall over the next five years so severe as to require earning more than an average of 11% per annum over the following ten years to recover to where the assets would have been by earning the actuarial rate of 8.5% annum.

The Board is saying here that it doesn't mind a substantial drop in assets so long as assets don't fall below ten times benefits.

But, the Board regards it to be a failure if the fund has to earn more than 11% per annum over the following ten years to catch up with the actuarial assumption as to fund earnings.

The failure rate of each asset allocation under consideration will depend on the weight which the Board assigns to each of these two risks.

A REALISTIC ILLUSTRATION OF PSAA

Part 3

As a supplement to the two risk avoidance criteria referenced above, the Board also wants to be comfortable that the cost of the plan, now 10% of payroll, doesn't average more than 12% of payroll over the next three years. This criterion is to get 50% weight, whereas earlier referenced risk criteria are to get 25% weight each.

A resulting performance index is established for each asset allocation and the Board decides to adopt the asset allocation delivering the optimum performance index.

HOW DOES PSAA DEVELOP AN OPTIMAL PORTFOLIO?

1. The plan characteristics are identified:
   payroll of participants,
   assets of fund [expressed in dollars or as a percentage of payroll]
   contribution levels currently applicable [expressed as a percentage of payroll]
   employer
   employee
   benefit levels projected to be expected over future years [expressed in dollars or as a percentage of payroll]
2. Risk aversion choices are identified with weights.
3. Plan cost weight is identified.
4. Investment return weight is identified.
5. Economic environment [either a prior economic period with appropriate modification, or a parametric model of an appropriate environment] is identified as the source of the Monte Carlo selections for simulation.
6. The PSAA model is activated.
7. A number of optimal portfolios are determined.
8. Performance indices of other candidates are studied and the preferred portfolio selected.
9. The process is repeated quarterly.

SECTION 2

Figure 1:
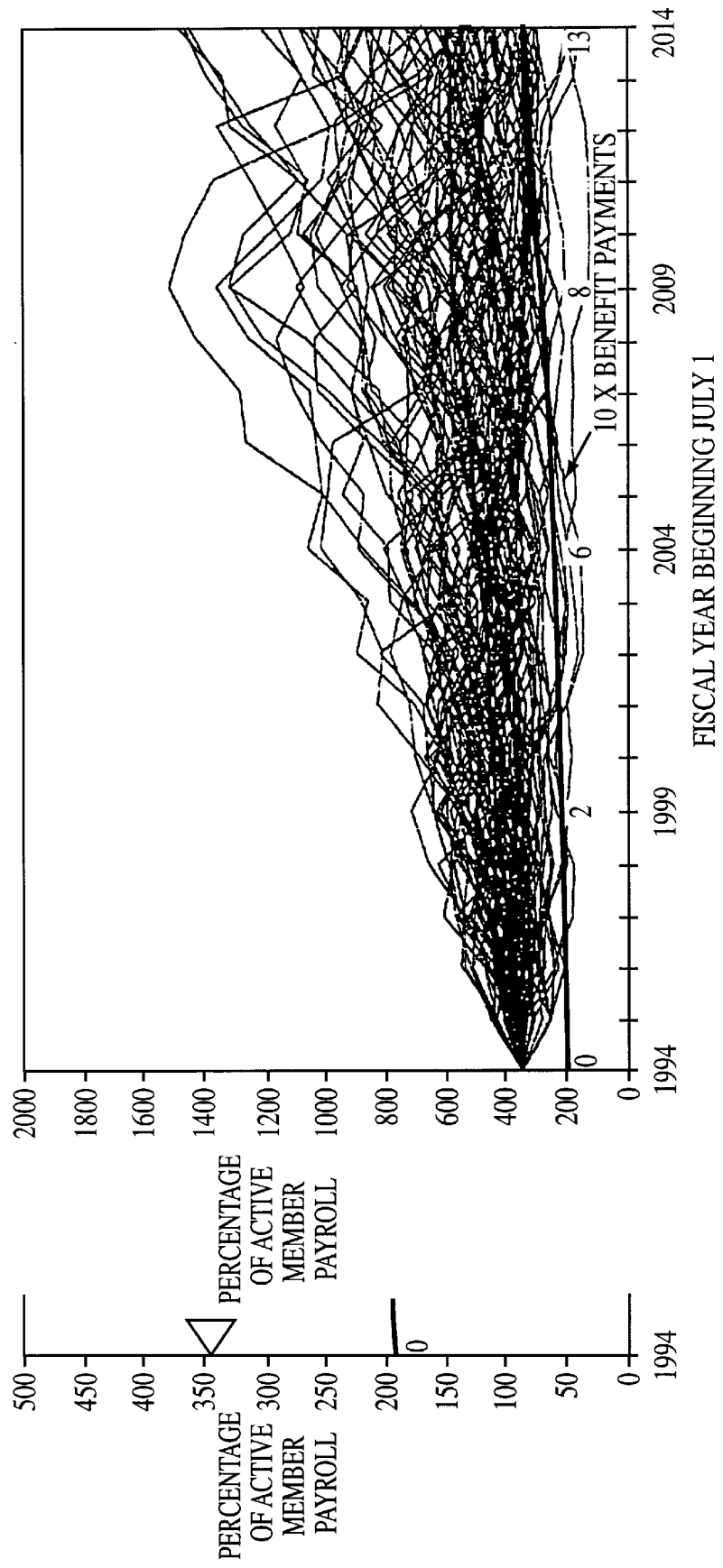
FIG. 1 is a graph of 100-trial simulations of cash flow of a pension trust fund with a focus on the probability of assets falling below ten times benefit payments.
Figure 2:
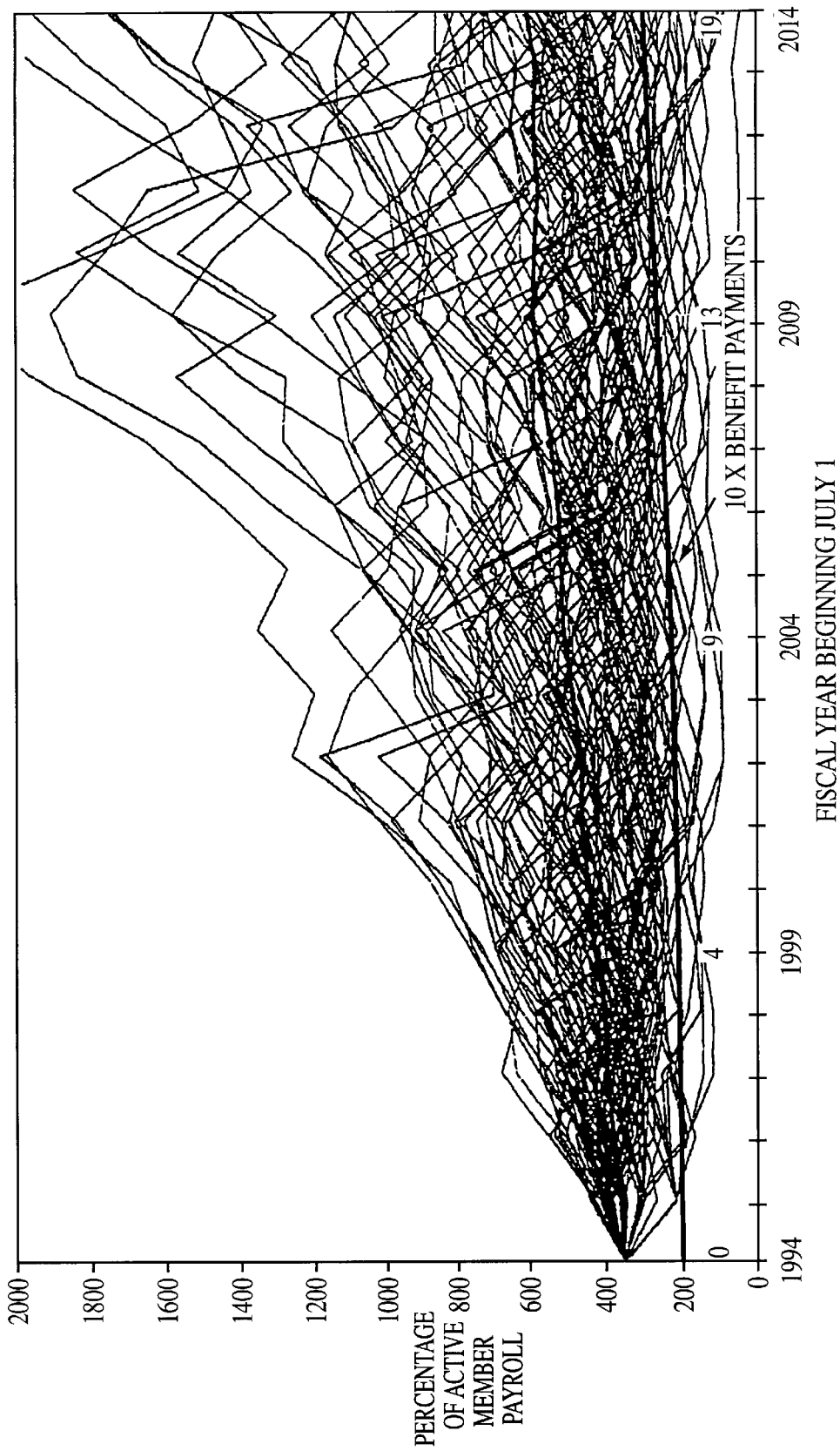
FIG. 2 is a graph of 100-trial simulations of cash flow of a pension trust fund with a focus on the probability of assets falling below ten times benefit payments.
Figure 3:
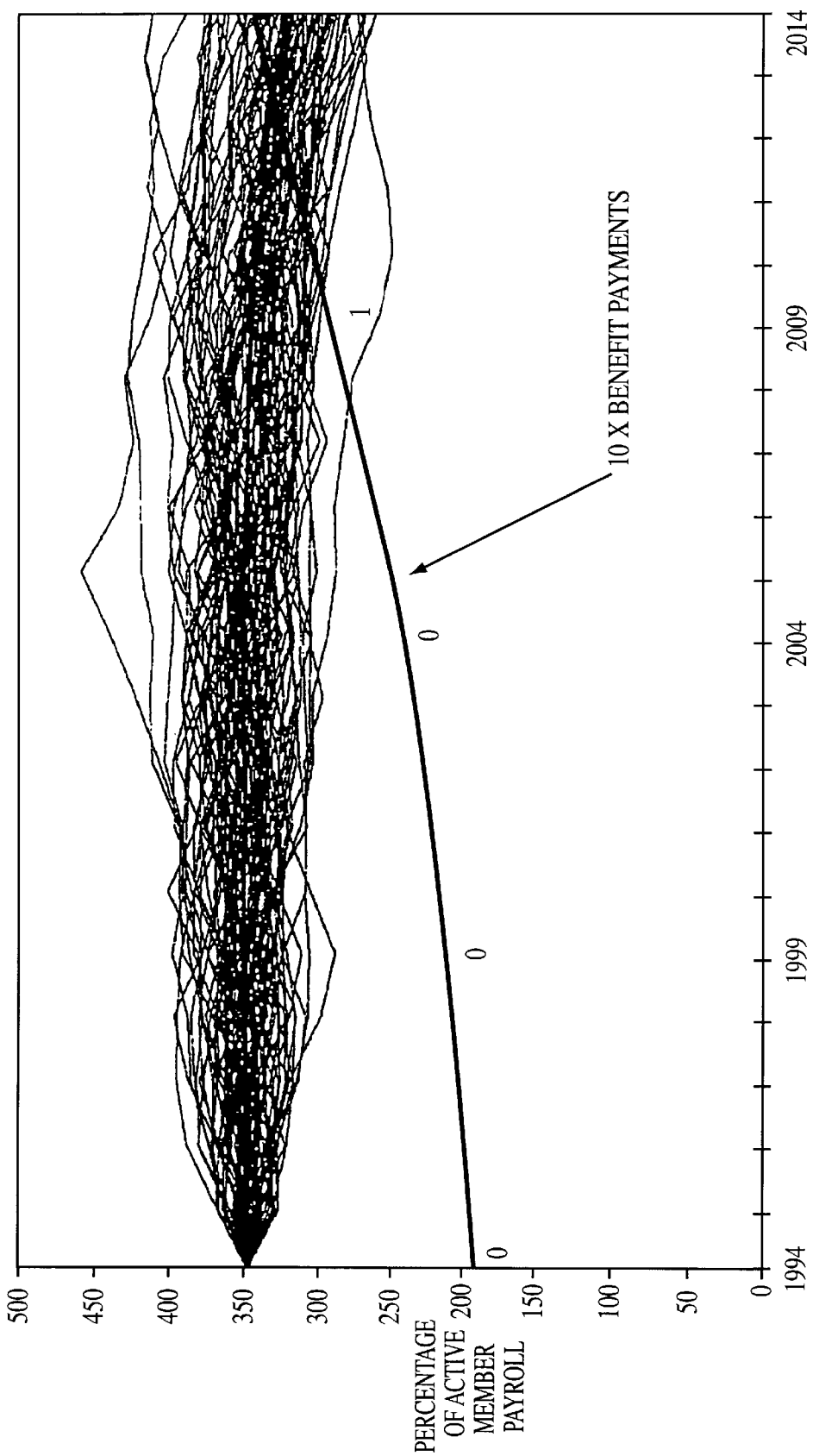
FIG. 3 is a graph of 100-trial simulations of cash flow of a pension trust fund with a focus on the probability of assets falling below ten times benefit payments.
Figure 4:
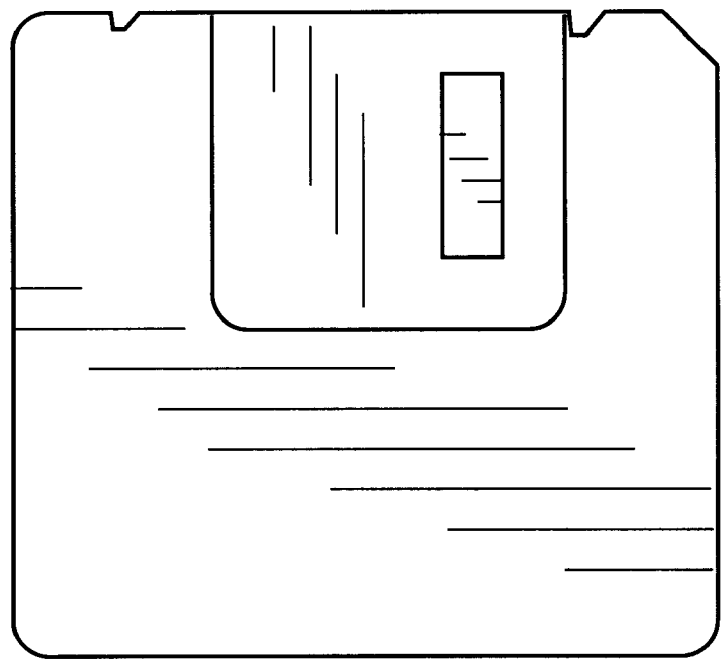
FIG. 4 is an example of a recording medium readable by a computer.

Simple Illustration of an ASSET/LIABILITY ANALYTICS Asset Allocation Optimization Process . . . for a Board of Trustees Finding the Asset Allocation Most Likely to Deliver YOUR Favorable Outcome for YOUR Plan (See Graphs A, B and C, labeled FIGS. 1–3, respectively, on the adjoining page.)

Setting the Stage

Each 100-trial bundle of simulations in Graphs A, B and C, labeled FIGS. 1–3, respectively, shows the 1994 starting value of trust fund assets as equivalent to 350% of member payroll. (This is easiest to see at the lefthand side of Graph C, labeled FIG. 3.)

The year 1994 may be likened to the fixed position of the nozzle of a hose which sprinkles water onto a lawn. The "nozzle" is the simulator which generates either a fine spray with a wide swath (simulating the possible paths of an all-stock portfolio) . . . or a ropelike spray (simulating the possible paths of an all cash portfolio) . . . or something in between. Each "sprinkle" is a simulation which leaves a trace which is recorded for analysis.

In FIGS. 1–3, graphs A, B, and C reflect 100-trial simulations of the evolving trust find market-value (expressed as a percentage of member payroll) over the 20-year period 1994 through 2014 under each of three different asset allocation selections.

In FIG. 2, graph B reflects simulations if the assets of the trust fund are invested 100% in stock.

In FIG. 3, graph C reflects simulations if the assets are invested 100% in cash equivalent securities. In FIG. 1, graph A, on the other hand, reflects simulations if the assets are invested in stocks (63%), bonds (28%), and cash (9%).

In 1994 the trust find has assets of 350% of the active member payroll. Over the years, these assets are increased by investment return, employer and employee contributions and reduced by pensioner benefit disbursements and by expenses.

Introducing a Risk Avoidance Policy

The trustees want to maximize return in the asset allocation selection but also want to protect benefit security. If converted into the purchase of annuities, a lump sum of somewhat less than, but in the neighborhood of 10 times benefits would be required to protect the security of all pensioners of record at any point in time. The trustees regard this as a floor of protection. They want to minimize the risk of failing to provide this floor of protection over the next 20 years.

A line at the bottom of each graph reflects ten times evolving benefit disbursements. Benefit disbursements increase more rapidly than payroll, starting at 19.5% of payroll in 1994 and reaching 36.5% of payroll in the year 2014. The "ten times" numbers are 195% in 1994 and 365% in the year 2014.

Simulation Analysis

Note the cross-overs in Graph A in FIG. 1. In 1999, two of the simulations drop below (fail) the ten times line. In 2004, five simulations drop below the line at the time and so on. Also note that the all-cash program has only one failure before the twentieth year but then, in the twentieth year, there are 82 failures because the investment return is insufficient to protect the program and the assets begin to fall relative to payroll.

If the trustees place 60% weight on expected portfolio investment return and 10% weight on reflection of anticipated frequency of failure to avoid crossing the floor at the intervals five years, ten years, fifteen years, and twenty years out, we have the following determinations:

| Asset Allocations | Expected Investment Return | Failure Frequency Out of 100 Simulations | | | | Performance Index[1] |
|---|---|---|---|---|---|---|
| | Weights 60% | 10% | 10% | 10% | 10% | 100% Total |
| | | 5 Years Out | 10 Years Out | 15 Years Out | 20 Years Out | |
| A | 8.5% | −2 | −5 | −6 | −13 | 2.5[2] |
| B | 10 | −4 | −9 | −13 | −19 | 1.5[3] |
| C | 5 | −0 | −0 | −1 | −82 | −5.3[4] |

[1] 60% of expected annual investment return percentage and 10% weight on each of four (negative) reflections of anticipated frequency of failure to avoid crossing the floor.
[2] 60% × 8.5 + 10% (-2-5-6-13)
[3] 60% × 10 + 10% (-1-9-13-19)
[4] 60% × 5 + 10% (-0-0-1-82)

The trustees select asset allocation A because of its superior performance index score based on the trustee designated criteria. But likely the Board will want to consider the optimum asset allocation under other risk avoidance and/or other combination risk avoidance and low cost choices and make a final decision after considering all alternatives.

Conclusion

Using the new wave asset/liability study approach outlined above, the plan's unique features—its costs, liabilities, and finding levels—are combined with the Board's unique and invaluable perception of the risks the plan faces to produce a new asset allocation analysis. This approach empowers Boards to move beyond the "efficient frontier" to plan-specific asset allocation that responds fully to the Board's priorities.

Figure 5:
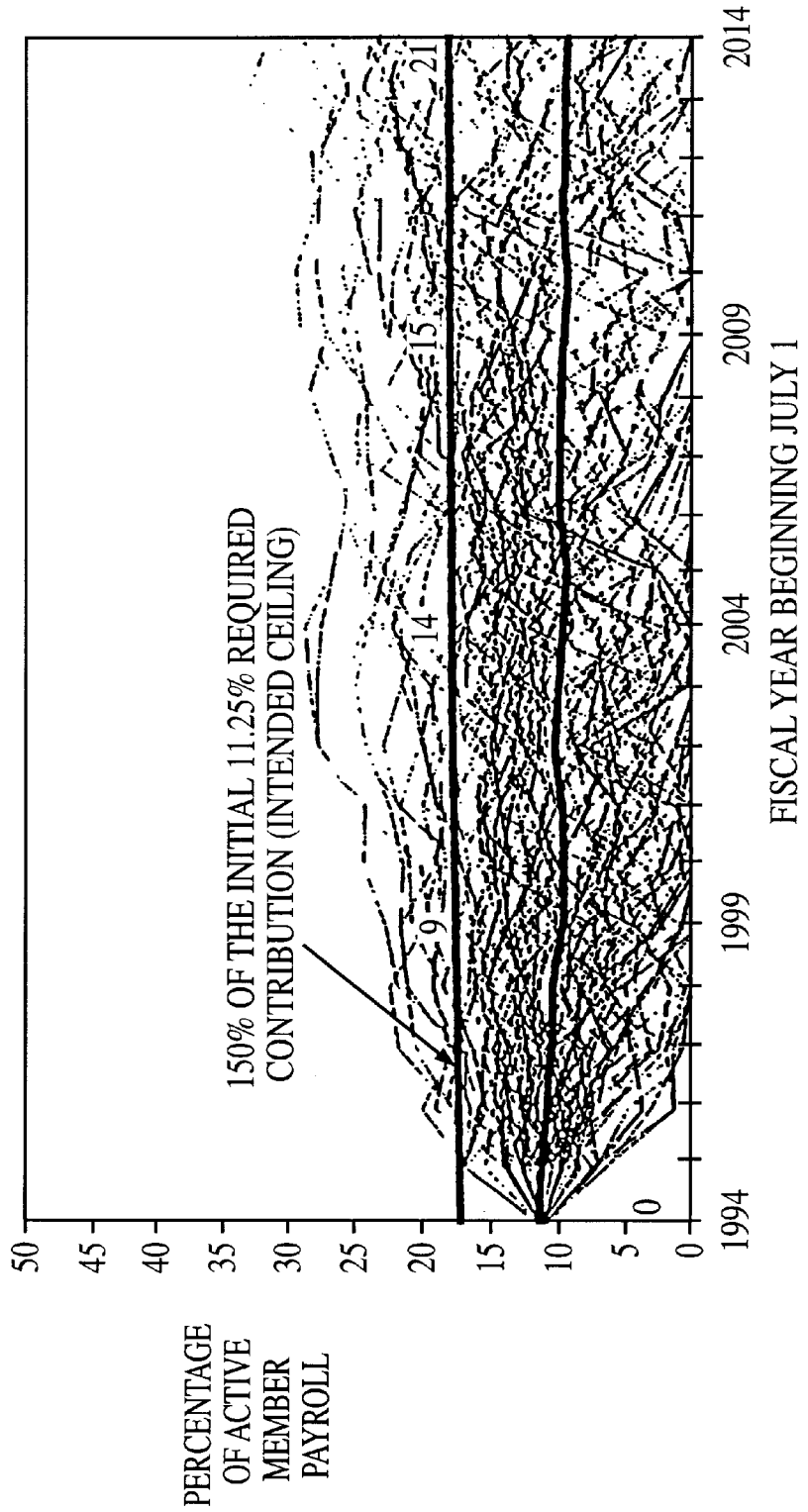
FIG. 5 is a graph of 100-trial simulations of contribution requirements of a pension trust fund as a percentage of payroll with a focus on the probability of a required contribution increase of 50% or more.
Figure 6:
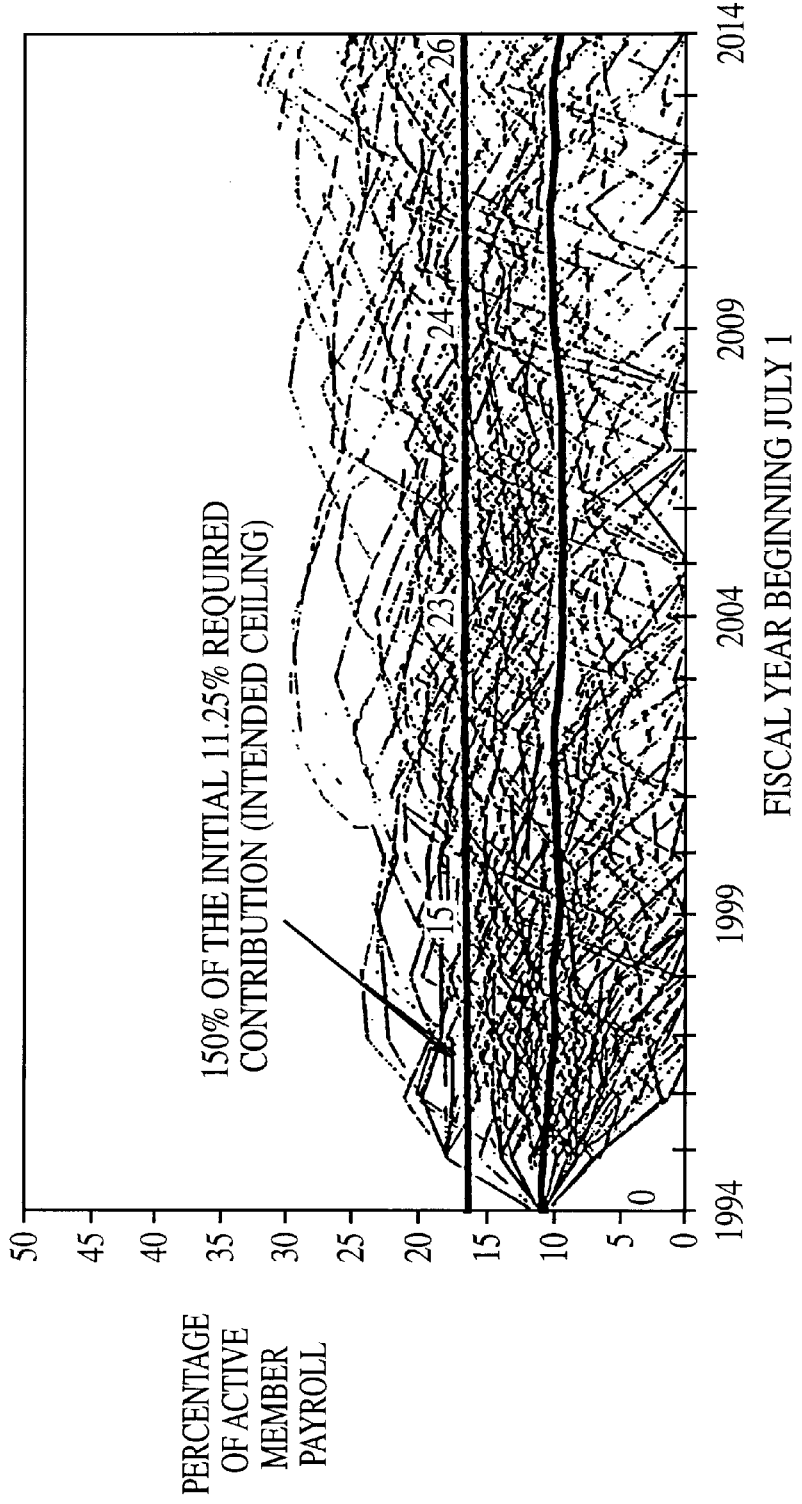
FIG. 6 is a graph of 100-trial simulations of contribution requirements of a pension trust fund as a percentage of payroll with a focus on the probability of a required contribution increase of 50% or more.
Figure 7:
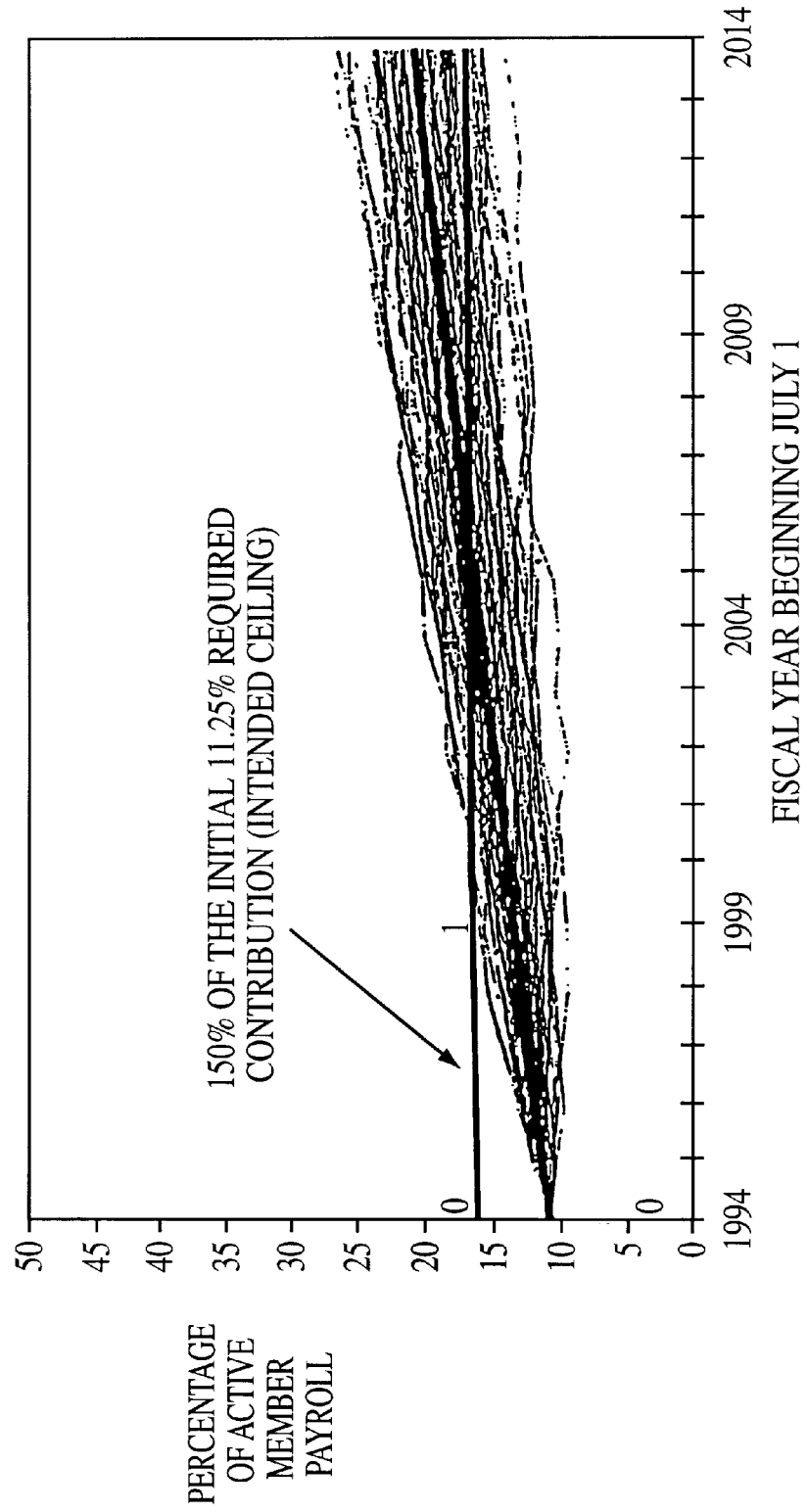
FIG. 7 is a graph of 100-trial simulations of contribution requirements of a pension trust fund as a percentage of payroll with a focus on the probability of a required contribution increase of 50% or more.

2nd Simple Illustration of an ASSET/LIABILITY ANALYTICS Asset Allocation Optimization Process . . . for a Board of Trustees Finding the Asset Allocation Most Likely to Deliver YOUR Favorable Outcome for YOUR Plan (See Graphs D, E and F, labeled FIGS. 5, 6, and 7, respectively, on the adjoining page.)

Setting the Stage

Each 100-trial bundle of simulations in Graphs D, E, and F, labeled FIGS. 5, 6, and 7, respectively, shows the 1994 starting value of plan costs as equivalent to 11.25% of member payroll.

In FIGS. 5–7, graphs D, E, and F reflect 100-trial simulations of the evolving plan cost (expressed as a percentage of member payroll) over the 20-year period 1994 through 2014 under each of three different asset allocation selections.

Figure 8:
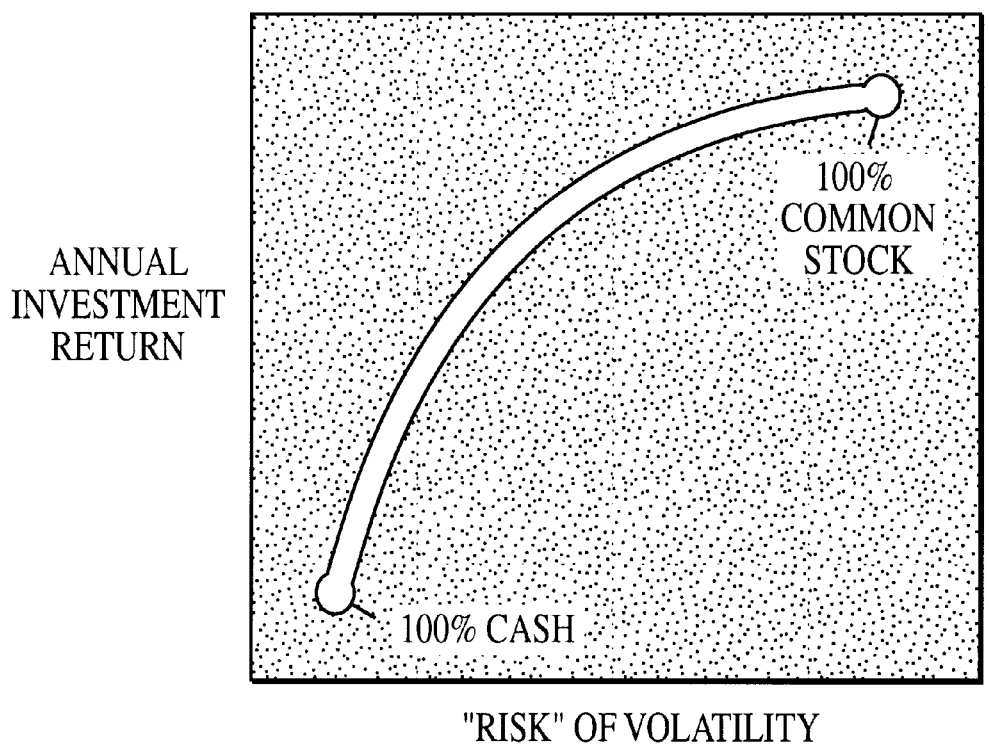
FIG. 8 is a graph relating annual investment return to risk of volatility.

In FIG. 6, graph E reflects simulations if the assets of the trust fund are invested 100% in stock. In FIG. 7, graph F reflects simulations if the assets are invested 100% in cash equivalent securities. In FIG. 8, graph D, on the other hand, reflects simulations if the assets are invested in stocks (63%), bonds (18%), and cash (9%).

The 1994 required contribution is 11.25% of the active member payroll. Over the years, these contribution requirements are impacted by employee contributions and by pensioner benefit disbursements and by expenses.

Introducing a Risk Avoidance Policy

The trustees want to maximize return in the asset allocation selection but also want to minimize the likelihood that the required contribution will increase by more than 50% during the next 20 years. The trustees regard this as a ceiling they would like to avoid crossing.

A line at the tom of each graph reflects 150% of the 11.25% initial required contribution. The central line is average contribution for all simulations and at the simulation traces tell us how many times we fail to avoid the intended ceiling during the next 20 years under each asset allocation scenario.

Simulation Analysis

Note the cross-overs in Graph D of FIG. 5. In 1999, nine of the simulations cross over (fail) the 50% increase line. In 2004, fourteen simulations cross over the line at the time and so on. Also note that the all-cash program has only one failure in the 5th year, but the failure rate climbs rapidly with 33 in the 10th year, 69 in the 15th year and 90 in the 20th year. The rapid climb occurs because the investment return is insufficient to prevent cost increase.

If the trustees place 70% weight on expected portfolio investment return and 7½% weight on reflections of anticipated frequency of failure to avoid crossing the ceiling (negative results) at the intervals five years, ten years, fifteen years, and twenty years out, we have the following determinations:

| Asset Allocations | Expected Investment Return | Failure Frequency Out of 100 Simulations | | | | Performance Index[5] |
|---|---|---|---|---|---|---|
| | Weights 70% | 7.5% | 7.5% | 7.5% | 7.5% | 100% Total |
| | | 5 Years Out | 10 Years Out | 15 Years Out | 20 Years Out | |
| D | 8.5% | −9 | −14 | −18 | −21 | 1.3[6] |
| E | 10 | −15 | −23 | −24 | −26 | 0.4[7] |
| F | 5 | −1 | −33 | −69 | −90 | −11.0[8] |

[5]70% weight on expected annual investment return percentage and 7/5% weight on each of four (negative) reflections of anticipated frequency of failure to avoid crossing the ceiling.
[6]70% × 8.5 + 7.5% (-9-14-18-21)
[7]70% × 10 + 7.5% (-15-23-24-26)
[8]70% × 5 + 7.5% (-1-33-69-90)

The trustees select asset allocation D because of its superior performance index score based on the trustee designated criteria. But likely the Board will want to consider the optimum asset allocation under other risk avoidance and/or other combination risk avoidance and low cost choices and make a final decision after considering all alternatives.

Conclusion

Using the asset/liability analytics study approach outlined above, the plan's unique features—its costs, liabilities, and funding levels—are combined with the Board's unique and invaluable perception of the risks the plan faces to produce a new asset allocation analysis. This approach empowers Boards to move beyond the "efficient frontier" to plan specific asset allocation that responds fully to the Board's priorities.

Relegating the "Efficient Frontier" to the Background.
Why Not Allocate 100% to Common Stock?

For decades decision makers have turned to the "efficient frontier" for alternative asset allocation selections. Because each point on the efficient frontier designates a mix of asset classes . . . each mix expected to expose the fund to the least investment return variability "risk" for an expected average level of return . . . decision makers are comforted. All they need to do is pick a preferred point on the "risk"/reward efficient frontier curve and proceed. And . . . after all . . . 100% common stock is on the efficient frontier . . . .

But the "efficient frontier" is no longer the place to look for risk avoidance.

Because pension plan risk is not portfolio volatility! Instead, pension plan risk is the change of unfavorable outcomes. Consider:

What about the risk of "budget busting" plan cost increases?
What about the risk of assets falling precipitously and causing unpleasant media reverberations?
or . . . on the other hand
What about the risk of not having assets sufficient to provide a floor of protection for current pensioners?
What about the risk of paying inadequate attention to climbing liabilities projected to be up ahead?

Bringing in the Liability Side in Addition to the Asset Side . . . by Simulation.
Why Not Allocate 100% to Common Stock
and if not,
What IS The Optimum Allocation?

This question cannot be answered by looking only at the asset side of the ledger. We must also look at the liability side. We must identify what we are trying to achieve and what risks we are trying to avoid.

Simulation to Measure Likelihood of Risk Avoidance Under Any Selected Asset Allocation To determine the likelihood of avoiding a particular risk or a particular set of risks . . . using any selected asset allocation . . . the future behavior of the plan . . . using that selected asset allocation . . . is monitored through hundreds of simulations of how the plan might perform in the future. Simulations are accomplished by creating random but realistic alternative future CPI's, and future asset class investment returns, to forecast future behavior of the system portfolio, and to forecast future benefit disbursements and plan costs and liabilities as of each future year. Simulations of the future behavior of the system portfolio are initiated by using a sequence of test asset allocations. The asset allocation underlying the particular bundle of simulations which delivers the best risk avoidance and high return (or low cost) combination is identified as optimum. See illustrations of the process on both sides of the fold-out inside the booklet. These examine the beginnings of the asset allocation optimizing process respecting the first and third questions on the prior page.

Risk Avoidance Policies

The core component of asset/liability analytics is the set of risk avoidance policies to be considered.

Illustrative Risk Avoidance Policies

The following are examples of some risk avoidance policies:

Plan costs should not increase by more than one-half within the next six years;

Assets shall not fall so far within the next three years that it will take 15 years with earnings averaging more than 12% per year to recover assets to the level which would have been reached had the fund earned the actuarial rate of return.

Market value of assets should not fall below 10 times annual program benefits anytime in the next five years;

On average, assets shall not be less than 90% of liabilities over the next seven years; or Note that these policies are plan specific. The plan's unique circumstances, and the perceptions concerning acceptable risk are factored directly into the asset allocation optimization processes.

Toward Asset Allocation Optimization

EXPLORING and APPRAISING the DEEPER and BROADER MEANING of RISK through

ASSET/LIABILITY ANALYTICS

Pension Plan Risk is NOT Portfolio Volatility!
Instead It Is the Chance of Unfavorable Outcomes YOUR Board of Trustees Would like to Avoid for YOUR Plan Successful Resolution of the Competing Objectives of Low Cost and Low Risk . . . is Accomplished by Finding the Best Affordable Outcome Generating ASSET ALLOCATION.

Asset allocation means apportioning plan assets to differing investment classes, like stocks or bonds or Treasury bills. Some investment classes (such as common stocks) have historically produced higher investment returns.

Higher investment returns on plan assets means less for the plan sponsor to contribute and less liabilities to finance. Thus,

ASSET ALLOCATION DRIVES SPONSOR PENSION COST AND LIABILITY LEVEL

If so,
Why Not Allocate 100% to Common Stock?

What is claimed is:

1. A computer program product storing computer instructions therein for instructing a computer to perform a process for determining a substantially optimal asset allocation utilizing cash flow simulation, the program product comprising:

a recording medium readable by the computer; and the computer instructions stored on said recording medium instructing the computer to perform the process, the instructions including:

(a) entering at least one of user selected risk avoidance weights or a user selected rate of return including definitions of risk for a given retirement plan;

(b) selecting a range of tolerable asset allocations for specific asset classes contained in an asset allocation list, the asset allocation list comprising a fixed class of investment and an equity class of investment, said selecting step (b) selecting maximum and minimum tolerable asset allocations for each of the fixed and equity classes of investments;

(c) generating one or more risk tolerance baselines based on one or more user defined risk tolerance factors;

(d) simulating benefit and asset cash flows as future financial projections based on the selected range of asset allocations and on plan benefit and payroll cashflows;

(e) determining if risk tolerance failure events occur by comparing the future financial projections with the one or more risk tolerance baselines;

(f) determining a performance index for the selected range of asset allocations based on a weighted average of the occurrence of the risk tolerance failure events and a cost of the plan; and (g) repetitively performing said steps (d), (e) and (f) for different asset allocations within the range of tolerable asset allocations generating a plurality of performance indices, and determining a substantially optimum asset allocation having a best performance index from among the plurality of performance indices; and allocating assets by at least one of a user and the computer, responsive to the substantially optimum asset allocation.

2. A computer program product storing computer instructions therein for instructing a computer to perform a process for determining a substantially optimal asset allocation utilizing cash flow simulation, the program product comprising:

a recording medium readable by the computer; and the computer instructions stored on said recording medium instructing the computer to perform the process, the instructions including:

entering at least one of user selected risk avoidance weights or a user selected rate of return including definitions of risk for a given financial plan into a computer;

selecting an asset allocation for specific asset classes contained in an asset allocation list previously stored in the computer;

generating a plurality of asset cash flow projections based on the selected asset allocation;

generating a single baseline, simulation average baseline or collection of risk tolerance baselines based on (i) a single predefined risk tolerance factor, (ii) an average of the risk tolerance factors evolving from all the asset cash flow projections in each simulation or (iii) a separate risk tolerance factor evolving from each cash flow projection within each simulation trial;

determining if a risk tolerance failure event occurs by comparing the asset cash flow projection with a risk tolerance baseline projection(s) underlying the said simulation and repeating this process for other asset allocations until that asset allocation generating the lowest rate of risk tolerance failure is found to determine the substantially optional asset allocation; and allocating assets by at least one of a user and the computer, responsive to the substantially optimal asset allocation.

3. A computer program product sorting computer instructions therein for instructing a computer to perform a process for optimizing a defined benefit retirement plan asset allocation, the program product comprising:

a recording medium readable by the computer; and the computer instructions stored on said recording medium instructing the computer to perform the process, the instructions including the steps of substantially optimizing the defined benefit retirement plan asset allocation as a mix of assets which may be expected to deliver a lowest probability of the plan experiencing a user defined adverse circumstance as of a selected future date or within a specified period, and, allocating assets by at least one of a user and the computer, responsive to the substantially optimal asset allocation, the plan is a specific year-by-year projected benefit outflow from a specific level of underlying assets, a specific employee contribution stream from an open group of current and future employees and a specific percentage of an open group payroll employer contribution stream, subject to anticipated asset class gains and losses that may be above or below expected levels;

the user defined adverse circumstance includes at least one of user selected risk avoidance weights or a user selected rate of return including a weighted average of one or more of the following: (i) assets falling below a specific multiple of benefits, (ii) employer contributions required to maintain a level percentage of payroll cost for plan financial soundness rising above or falling below a first certain percentage of initial level, (iii) assets falling below a second certain percentage of liabilities or (iv) assets falling below a point from which a return to the initial level of expected investment return has a lower than acceptable probability; and the mix of assets is subject to user constraints as to the portion of assets allowable in each asset class in the final portfolio, whereby an optimized asset portfolio is created or maintained.

4. A computer program product storing computer instructions therein for instructing a computer to perform a process for determining a substantially optimal asset allocation utilizing cash flow simulation, the program product comprising:

a recording medium readable by the computer; and the computer instructions stored on said recording medium instructing the computer to perform the process, the instructions including:

(a) entering user defined criteria including at least one of user selected risk avoidance weights, a user selected rate of return, or user selected plan profile information, asset information (including current market value, current asset allocation by class), economic assumptions (including assumed rate of return on plan assets, employee contribution requirements, third-party financing input and employer funding method in place);

(b) selecting a range of tolerable asset allocations for specific asset classes contained in an asset allocation list, the asset allocation list comprising a fixed income class of investments, and an equity class of investments, said selecting step (b) also selecting maximum and minimum tolerable asset allocations for each of the fixed and equity classes of investments;

(c) for a tentatively selected asset allocation within the tolerable range, generating (projecting over a designated future time frame in stochastic manner by Monte Carlo simulation) multiple cash flow forecasts of (i) plan assets and (ii) one or more user-selected risk tolerance baselines; and determining a weighted average measure of risk tolerance failure (unfavorable outcomes) by computer examination of the number of crossing violations of the risk tolerance baselines; and generating, on a computer monitor for printout display and analysis, a reflection of the depth (degree of badness) of crossing violations as well as the height (degree of goodness) of favorable outcomes, where:

Plan assets are projected into the future by starting with assets on hand, subtracting benefits as they are projected to be disbursed, adding projected employee and third-party contributions, introducing projected investment returns and a projected percentage of payroll employer contributions as are necessary to maintain financial soundness of the plan;

Risk tolerance baselines include:
  a user-selected multiple of benefits;
  a projected percentage of payroll employer contribution level at more or than an initial level by a user-designated margin;
  a user-designated percentage of user-defined liabilities;
  that a diminished level of assets from which return to an initially assumed rate of investment return within a user-selected number of years has a lower user-designated probability of occurrence than acceptable to a user; and
  other comparable user-designated alternatives;

Projected investment returns of individual asset classes are either an interaction of projected inflation deflators and real (net of inflation) asset class returns generated independently of each other or in tandem, with projections historically (or modified historically) or parametrically developed or, projected nominal rates of return of individual asset classes are extracted from history by stringing together consecutive periods of user-selected length;

Projected percentage of payroll employer contributions are dependent on feedback from the results of other simulated inflows and outflows, an overlay of computer-developed amortization over a user-selected amortization period of investment return gains and losses relative to an underlying user-selected baseline rate of return, such percentage of payroll employer contributions to reflect the requirement that employer contributions be a balancing item to maintain financial soundness of the plan;

(d) repetitively performing step (c) for different asset allocations within the tolerable range until the asset allocation having the lowest weighted average measure or risk tolerance failure, or performance index, is determined; and (e) allocating assets by at least one of a user and the computer, responsive to the asset allocation having the lowest weighted average measure of risk tolerance failure.

5. A computer program product according to claim 4, wherein said generating step (c) further comprises the step of including, in a determination of a best performance index, risk tolerance failures (unfavorable outcomes) at or within different intervals (whether or not weighted as to importance).

6. A computer program product according to claim 4, wherein said generating step (c) further comprises the step of including, in a determination of a best performance index, a weighted measure of the cost of the plan.

7. A computer program product according to claim 4, wherein said generating step (c) further comprises the step of selecting another range of tolerable asset allocations for the specific asset classes contained in the asset allocation list.

8. A computer program product storing computer instructions therein for instructing a computer to perform a process for determining a substantially optimal asset allocation utilizing cash flow simulation, the program product comprising:

a recording medium readable by the computer; and
the computer instructions stored on said recording medium instructing the computer to perform the process, the instructions including:
  (a) entering at least one of user selected risk avoidance weights or a user selected rate of return including definitions of risk for a given financial plan into a computer;
  (b) selecting a range of tolerable asset allocations for specific asset classes contained in an asset allocation list, the asset allocation list comprising a fixed income class of investments and an equity class of investments, said selecting step (b) also selecting maximum and minimum tolerable asset allocations for each of the fixed and equity classes of investments;
  (c) generating, over a designated future time frame, one or more risk tolerance baselines including minimum level of plan assets, maximum or minimum level of plan costs, percentage of liabilities, required plan earnings, and other user-designated alternatives;
  (d) simulating benefit and asset cash flows as future financial projections based on the selected range of asset allocations and on plan benefit cashflow projections;
  (e) determining the frequency (crossovers) of risk tolerance failure events by comparing the simulated future financial projections including liabilities, costs, benefits, recovery interest rate and assets with one or more risk tolerance baselines as of selected points in time or within selected time frames;
  (f) generating, on a computer monitor for print-out display and analysis, a reflection of the depth (degree of badness) of crossing violations of said risk tolerance failure events as well as the height (degree of goodness) of favorable outcomes;

(g) determining a performance index for the selected asset allocation, based on (i) user-selected weighted average of the frequency of the various risk tolerance failures at (ii) user-selected points in time or during time intervals, and on (iii) user-selected weights on a measure of cost of the plan;

(h) repetitively performing said steps (d), (e), (f) and (g) for different asset allocations within the range of tolerable asset allocations until the plan specific optimal asset allocation having a best performance index is determined;

(i) selecting another range of tolerable asset allocations for the specific asset classes contained in the asset allocation list; and (j) simulating benefits and asset cash flows as additional future financial projections based on the newly selected range of tolerable asset allocations by repeating steps (d) through (h);

(k) determining another performance index for each newly selected range of tolerable asset allocations;

(l) repetitively performing said steps (i), (j) and (k) within other ranges of tolerable asset allocations until other optimal asset allocation having other best performance indices are determined;

(m) selecting the optimal asset allocation with the best performance index, and allocating assets by at least one of a user and the computer, responsive to the substantially optimal asset allocation.

9. A computer program product storing computer instructions therein for instructing a computer to perform a process for determining a substantially optimal asset allocation utilizing cash flow simulation responsive to a range of tolerable asset allocations and one or more risk tolerance baselines based on one or more user defined risk tolerance factors, the program product comprising:

a recording medium readable by the computer; and the computer instructions stored on said recording medium instructing the computer to perform the process, the instructions including:

(a) determining when a risk tolerance failure event occurs by comparing a user defined future financial projection responsive to a selected asset allocation in the range of tolerable asset allocations with the one or more risk tolerance baselines;

(b) generating a performance index for the selected asset allocation responsive to at least the occurrence of the risk tolerance failure event;

(c) repeating steps (a) and (b) for a plurality of selected asset allocations in the range of tolerable asset allocations generating a plurality of performance indices, and determining the substantially optimum asset allocation having a best performance index from among the plurality of performance indices; and (d) allocating assets by at least one of a user and the computer, responsive to the substantially optimal asset allocation.

10. A computer program product according to claim 9, wherein the user defined risk tolerance factors comprises user selected risk avoidance weights which are applied to at least one of predefined risk failure weights and average return for each asset allocation.

11. A computer program product according to claim 9, wherein the user defined risk tolerance factors establish a threshold multiple of a risk factor as of at least one of a given time and within a given time frame.

12. A computer program product according to claim 9, wherein the user defined future financial projection comprises at least one of user selected risk avoidance weights or a user selected rate of return including plan specific definitions of risk for a given retirement plan.

13. A computer program product according to claim 9, wherein said generating step (b), further comprises the step of generating a performance index for the selected asset allocation based on a weighted average of the occurrence of the risk tolerance failure event and a cost of a plan.

14. A computer program product storing computer instructions therein for instructing a computer to perform a process for determining a optimal asset allocation utilizing cash flow simulation responsive to a range of tolerable asset allocations and one or more risk tolerance baselines based on one or more user defined risk tolerance factors, the program product comprising:

a recording medium readable by the computer; and the computer instructions stored on said recording medium instructing the computer to perform the process, the instructions including:

(a) determining the frequency of risk tolerance failure events within any selected future time interval by counting the number of crossings of (i) a specified number of simulations of user defined projected assets, user defined projected costs or a user defined projection of any other evolving financial characteristic over (ii) one or more risk tolerance baselines, where assets are allocated to any one of a number of asset class configurations within a particular range of tolerable asset allocations;

(b) generating for each asset allocation within the tolerable range a weighted average failure rate frequency performance index, wherein the frequency of failure to avoid each user selected risk tolerance factor at each user specified interval is given a user assigned weight;

(c) repeating steps (a) and (b) for a sufficient number of asset allocations within the tolerable range so as to determine the particular asset allocation with the best performance index, and (d) allocating assets by at least one of a user and the computer, responsive to the particular asset allocation with the best performance index.

15. A computer program product according to claim 14, wherein said determining step (a) includes consideration of other tolerable asset ranges.

16. A computer program product according to claim 15, wherein said generating step (b) comprises the step of generating a measure of the cost of the plan to be included, with its user selected weight, as a component of the performance index.

17. A computer program product according to claim 15, wherein said determining step (a) further comprises a display of the depth (degree of badness) of crossing violations of said risk tolerance failure events as well as the height (degree of goodness) of favorable outcomes.

* * * * *